(12) United States Patent  
Ebel et al.

(10) Patent No.: US 10,902,429 B2
(45) Date of Patent: Jan. 26, 2021

(54) LARGE DATASET STRUCTURING TECHNIQUES FOR REAL TIME FRAUD DETECTION

(71) Applicant: PAYPAL, INC., San Jose, CA (US)

(72) Inventors: Lior Ebel, Modi'in (IL); Shir Fiszman, Givatayim (IL)

(73) Assignee: PayPal, Inc., San Jose, CA (US)

( * ) Notice: Subject to any disclaimer, the term of this patent is extended or adjusted under 35 U.S.C. 154(b) by 410 days.

(21) Appl. No.: 15/465,506

(22) Filed: Mar. 21, 2017

(65) Prior Publication Data

US 2017/0270529 A1 Sep. 21, 2017

Related U.S. Application Data

(60) Provisional application No. 62/311,326, filed on Mar. 21, 2016.

(51) Int. Cl.
*G06F 16/2458* (2019.01)
*G06F 16/2455* (2019.01)
(Continued)

(52) U.S. Cl.
CPC ..... *G06Q 20/4016* (2013.01); *G06F 16/2477* (2019.01); *G06F 16/24568* (2019.01); *H04L 63/1408* (2013.01)

(58) Field of Classification Search
CPC ............... G06Q 20/4016; G06Q 20/40; G06F 16/2477; G06F 16/24568; G06F 16/2458;
(Continued)

(56) References Cited

U.S. PATENT DOCUMENTS 7,458,508 B1 * 12/2008 Shao ............... G06Q 20/04
235/380
2004/0236632 A1 * 11/2004 Maritzen ........... G06Q 20/28
705/26.1
(Continued)

OTHER PUBLICATIONS (http://www.mathcs.emory.edu/~cheung/Courses/171/Syllabus/8-List/array-queue2.html) (Archive year found of 2015) (Year: 2015).*
(Continued)

*Primary Examiner* — Kenneth Bartley
*Assistant Examiner* — Gregory M James
(74) *Attorney, Agent, or Firm* — Haynes and Boone LLP

(57) ABSTRACT

Database organizational techniques and structures may impose storage and computational limits that render particular operations too slow to effectively execute within speed guarantees (e.g. allowing a function to be completed within 300 ms). Thus, sometimes it is inefficient to access and maintain certain data, particularly in large data environments. One such environment relates to event logging for security, fraud, and risk purposes. When hundreds or thousands of events can occur in short time periods, database queries can be slow. By using particular algorithms and data structuring, however, event log data can be utilized in a flexible and speedy manner in various embodiments that may still enable service guarantees to be met. In some cases, this may involve updating one or more event counters for one or more particular periods of time, which may be indicative of event velocity (i.e. how often certain events are occurring).

20 Claims, 9 Drawing Sheets

(51) Int. Cl.
*G06Q 20/40* (2012.01)
*H04L 29/06* (2006.01)

(58) Field of Classification Search
CPC .. G06F 16/2455; H04L 63/1408; H04L 29/06
See application file for complete search history.

(56) References Cited

U.S. PATENT DOCUMENTS

| | | | | |
|---|---|---|---|---|
| 2008/0086409 | A1* | 4/2008 | Moorman | G06Q 40/00 705/38 |
| 2010/0228580 | A1* | 9/2010 | Zoldi | G06Q 40/025 705/38 |
| 2010/0280882 | A1* | 11/2010 | Faith | G06Q 20/4016 705/7.37 |
| 2010/0280950 | A1* | 11/2010 | Faith | G06Q 20/4016 705/44 |
| 2011/0093430 | A1* | 4/2011 | B'Far | G06N 5/04 706/55 |
| 2011/0161492 | A1* | 6/2011 | Granville | G06Q 30/0246 709/224 |
| 2011/0196791 | A1* | 8/2011 | Dominguez | G06Q 20/40 705/44 |
| 2011/0258118 | A1* | 10/2011 | Ciurea | G06Q 40/00 705/44 |
| 2012/0136780 | A1* | 5/2012 | El-Awady | G06Q 20/14 705/40 |
| 2012/0167162 | A1* | 6/2012 | Raleigh | H04L 63/10 726/1 |
| 2013/0110715 | A1* | 5/2013 | Buchhop | G06Q 40/02 705/42 |
| 2013/0204880 | A1* | 8/2013 | Lesiecki | G06F 16/2468 707/748 |
| 2013/0282583 | A1* | 10/2013 | Siddens | G06Q 20/405 705/44 |
| 2014/0108251 | A1* | 4/2014 | Anderson | G06Q 20/4016 705/44 |
| 2014/0304130 | A1* | 10/2014 | Winters | G06Q 30/0226 705/35 |
| 2015/0046224 | A1* | 2/2015 | Adjaoute | G06Q 20/4016 705/7.31 |
| 2016/0210633 | A1* | 7/2016 | Epelman | G06Q 20/4016 |
| 2017/0083898 | A1* | 3/2017 | Sidhu | H04L 67/30 |
| 2017/0270529 | A1* | 9/2017 | Ebel | G06Q 20/4016 |

OTHER PUBLICATIONS

"Daisuke Mashima, Towards A User-Centric Identity-Usage Monitoring System, 2008, IEEE" (Year: 2008).*

* cited by examiner

| Name | Account ID | Event Time | | Event Details | Unique Last 24 Hour Event Count | Unique Last 48 Hour Event Count |
|---|---|---|---|---|---|---|
| John Smith | 1234 | 1/1/2017 | 2:34pm | ... | 1 | 2 |
| | 5678 | 1/2/2017 | 12:01am | ... | | |
| | 5678 | 1/1/2017 | 6:15pm | ... | | |
| | 3214 | 12/31/2016 | 11:00am | ... | | |
| | ... | | | | | |
| 302 | 304 | 306 | | 308 | 310 | 312 |

300

*Current Date and Time:*
*1/2/2017, 5:00pm*

*FIG. 3*

LARGE DATASET STRUCTURING TECHNIQUES FOR REAL TIME FRAUD DETECTION

RELATED CASES

This case claims the benefit of priority from U.S. Application 62/311,326, entitled "EVENT STREAM COUNTER TO TRACK DISTINCT VALUES PER KEY", filed on Mar. 21, 2016, the contents of which are herein incorporated by reference in their entirety.

TECHNICAL FIELD

This disclosure relates to improvements in data structuring and organization, particularly for large data environments where conventional database techniques may be insufficient to meet performance run-time guarantees. These techniques may be applied to fraud detection in various instances.

BRIEF DESCRIPTION OF THE DRAWINGS

FIG. 3 illustrates one embodiment of a database record.

DETAILED DESCRIPTION

Figure 1:
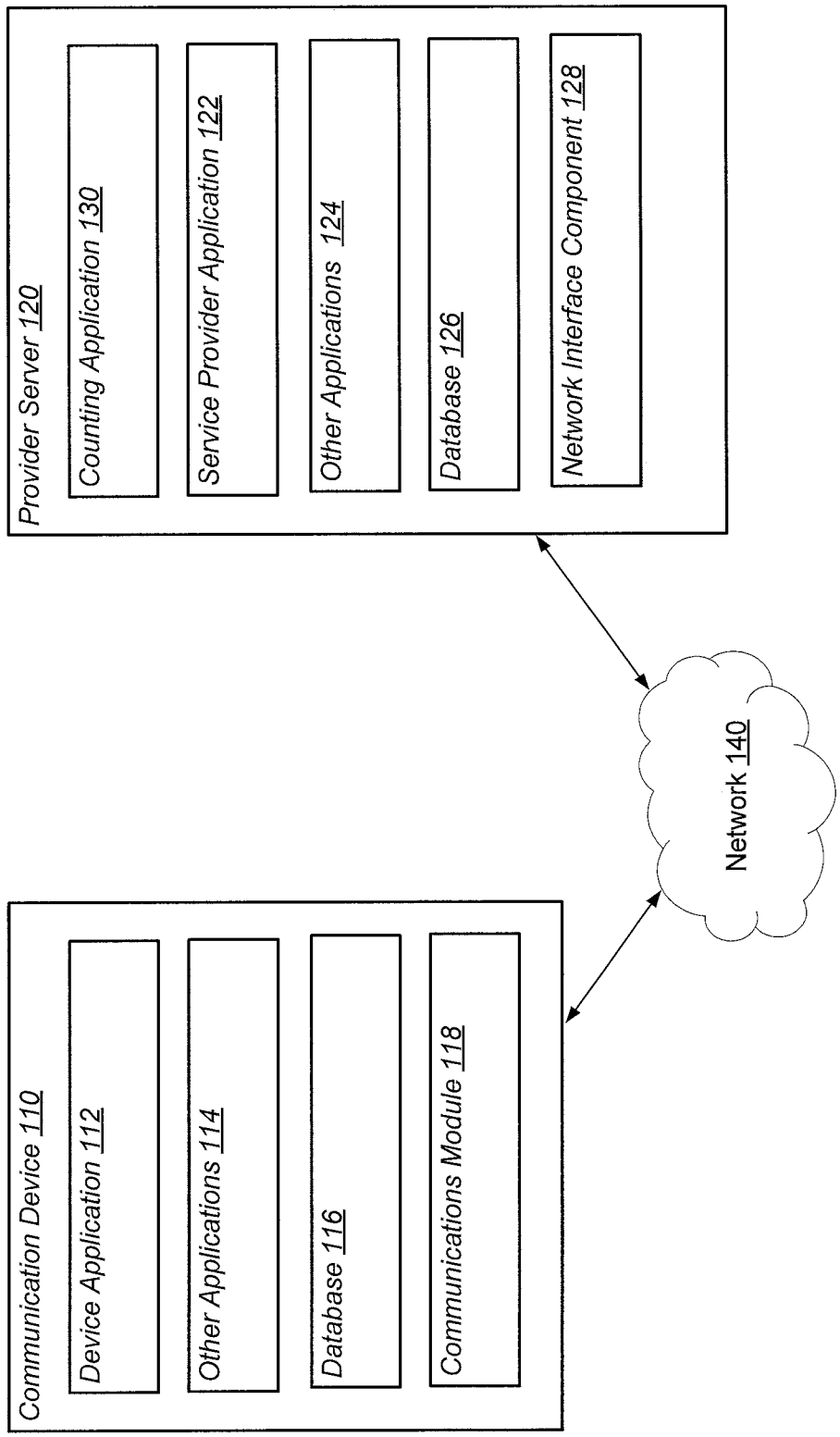
FIG. 1 illustrates a block diagram of a system, according to some embodiments.

In big data environments, implementation choices can have significant effects on execution times. This is particular true where a service level agreement (SLA) or other arrangement requires that a task execute quickly.

By optimizing the scheme via which data is stored and maintained, certain queries can run more effectively. Database keys, for example, such as unique account IDs, can enable fast querying. Traversing lists may prove ineffectively slow, however.

In the area of risk, one type of data that can be useful is velocity of use data. For electronic payment transactions, for example, fraudulent actors often act with several or many different accounts in parallel. These accounts (and actions taken with) may have shared characteristics that can be assessed to more accurately predict a risk of fraud. A fraudster may order goods to be delivered to an address, for example, on ten different accounts. To ensure arrival of the goods, the fraudster may use the same name (or similar variants) and may also use the same address. If these or other such patterns of fraud can be detected, merchants and service providers can be saved both inconvenience and revenue when a potentially fraudulent transaction is identified.

In the context of electronic commerce, however, risk-based decisions may need to be made fairly quickly (e.g. a few hundred milliseconds). A long and slow risk evaluation process could cause transactions to execute so slowly overall that legitimate business would be negatively impacted by the friction introduced to the transaction.

Thus, it can be important to assess risk quickly but also accurately. Previous techniques for assessing risk were not always maximally optimized, however, particularly in the area of velocity of use for information items such as name, shipping address, etc. Improved database techniques can allow for fast yet accurate risk characterization, as further discussed below.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

This disclosure includes methods utilized for an event stream counter to track distinct values per key. Systems and executable instructions suitable for practicing methods of the present disclosure are also provided. Further techniques are also described.

A counter or listener for a stream of events may be utilized by a computing entity to determine a number of unique occurrences of a value for a specific key within the stream of events in various instances. For example, a stream of events may correspond to events associated with one or more users or user identifiers (IDs). In this regard, each event in a stream of events may correspond to actions taken by the user or some other online process initiated by or associated with a user. Thus, one type of stream of events may be user visits to a website, logins to the website, or navigation associated with the website. Each event in the stream of events may correspond to a specific user, as well as keys, data, or other metadata associated with the event and a timestamp for the event. In various instances, the stream of events may be events that are relevant to fraud detection and fraud modeling, and may include purchases and purchase attempts.

A "key" for an event may correspond to some specific associated data/metadata with the event, such as location of login, country of login, device login type, or any other ID or data for the event. Thus, a key may be any statistic that may be desirable to track with an event (e.g., login application/browser, browser name, etc.). Values for the key may be user IDs for the event having the key, so that the number of distinct values is the number of distinct user IDs having the event. Moreover, the key may be tracked over a period of time and/or for a time interval. The number of distinct values for a key over a period of time may correspond to the number of distinct user IDs for the key over the last X time period, where X may further be a specified time interval, such as days, hours, etc. Additionally, any value may be tracked for any key in an event or a period of time, so long as the stream of events includes the event having the value and the key. Thus, an event in the stream of events may be received and/or stored in the format of an event ID, a user ID or other value, one or more keys, and a timestamp.

Note that in some embodiments, the term database key refers to a key that is used within a database (e.g. a relational database) to be able to uniquely identify individual records. Thus, a database key may refer to an attribute (or a group of attributes) that is unique for each record within a group of records, such as a database table. A database key may be a "key" for an event as described above, in various embodiments.

In order to track the number of distinct values per key, a counter application may be executed by an online service provider or other entity, e.g. an entity receiving the stream of events. For example, an online payment provider, service provider, or an account providing entity may wish to track unique users visiting a website for a time period (e.g., last day, last two days, etc.). The online entity may execute the counter application to determine the number of unique values per key through event data (e.g., event ID, user ID, key(s), and timestamp) in the incoming stream or the stream retrieved from a database. The counter application may function as a daemon that monitors the incoming stream of events in the background of the online entity's operating system (e.g., without user input) and may be associated with an events history table and a key container table stored to a database and database tables that may be processed and/or updated. For example, the events history table may include events in the stream of events with corresponding values, keys, and timestamps. The key container table may include a key, such as location of login, such as a country of login for a login event ID for a user ID. The key container table may include columns for the time interval selected. For example, if the unique users' logins for a country are tracked per day, then the columns will include a number of days for a set time limit, such as a month, 30 days, etc. Thus, if the set time limit is 30 days, 30 individual columns for each day may make up the key container table. Thus, each column may correspond to a date or a previous time according to the time interval set for the key container table. For example, if the time interval is daily (e.g., number of unique visitors per day), each column may correspond to a past day, such as today (e.g., X), yesterday (1 day ago, or X+1 where X is the current day), 2 days ago (X+2), etc. to X+set time limit. The key container table may be a circular array, so that the values loop back over the set time limit.

In order to update the key container table, the counter application may further shift columns of the key container table in the database, for example, to properly associate the column values with respect to the event dates. For example, the key container table may include a last date updated column or table value that determines the last time for the date updated. The last date updated may track the last time the key container table was updated by the counter application. Where the last date updated matches the date of a timestamp used to update the key container table or a time of update by the counter application, no action may be taken. However, if the last date update is another time previous to the current time and/or timestamp used to update the key container table, then the columns may be "shifted" by the value of the time interval difference between the last date updated column or table value and the current time and/or timestamp used to update the key container table. For example, if the last date updated is 2 days prior to the current date or timestamp used to update the key container table, and the time interval for tracking unique users per country is daily, then the columns may be shifted by 2 in order to account for the difference between the last date updated and the current date or timestamp used to update the key container table.

The counter application may update the key container table based on incoming events in the event data stream. For example, the stream of events may include one or more logins for a first user from Country A. The key container table may track distinct logins per country, including Country A. The key container table may only correspond to Country A, or may include a row for each country, for example, countries A-Z including Country A. When the counter application receives a stream of events, it may analyze the stream to determine whether the stream includes an event ID having a user ID for the user, with a key matching Country A (e.g., data acknowledging the login for the event ID was from Country A). Thus, the counter application may fetch the list of events for the current value (e.g., user ID) from the events history table. If an event ID in the stream matches the key, the counter application may determine if the key appears in the past list of events for the user ID. If the key is not previously found for the specific user ID, then all columns of the key container table are incremented by 1. Thus, where no other user IDs are in the table, then the table would have a 1 in each column for 1 unique user over the last set amount of time (e.g., 1 unique user over the last month). Where the stream of events is analyzed after the fact (e.g., at some future time after the timestamp for the event having the key for the user ID (value)), then only those columns may be incremented corresponding to the timestamp. Thus, if the counter application is processing today, and the last login for the user ID from Country A is 2 days ago, only those columns for 2 days ago through the end of the set time limit may be incremented (e.g., increment by 1 those columns for X+2 through X+set time limit).

However, if the key for that user ID (value) has previously been found in the stream of events, than the counter application will not increase every column in the key container table by 1 in various embodiments. This may occur when a new event in a stream of events comes in having the key (Country A) for the analyzed value (the user ID) after the previous event. For example, the counter application may further process the stream N days after the initial processing to increment every column by 1 in the key container table when an event ID having the user ID (value) and Country A (key) was detected. The counter application may detect, at the N day later mark, a second event ID having the same user ID for the same key. In order to properly update the key container table, the counter application may only update the key container table for current time, the last 1 day, the last 2 days, to the last N−1 days, while leaving the Nth day through the X+set time limit days without incrementing during the present processing. Thus, the key container table instead reflects in various embodiments that the user is a unique user login for Country A from N (today or the next detection of the second event ID having the user ID and the key after the first event) to the set time limit. In other embodiments where the counter application may process previous data, the time N after the first event ID may not correspond to a present date, which may then cause the remaining columns between the N date and the present date as 0 or without incrementing.

For a second user, the counter application may update the table the same as the counter application did for the first user. In other embodiments, the second user may instead be the same user, however, with a different account number or ID. Thus, the database values for the key container table may reflect a plurality of users added to the row for Country A based on event IDs for the plurality of users having their user IDs (values) and Country A (key) associated with the event IDs. If the counter application has updated the key container table for a plurality of users, a first and a second user in the present example, then the key container table will show the number of unique visitors over the time period. Thus, if the first user is detected as visiting twice, at the current date and N days ago in the above discussed example, than the key container table may count the first user from today over the tracked time period (e.g., the set time limit, such as thirty days). Where the second user from Country A last logged in 2 days ago, the columns in the key container table may count the second user from 2 days ago through the set time limit. Thus, when examining the table, at the present date, if a query asks how may unique users have we had over the last 2 days to the last (set time limit) day, the query may return 2 unique users. However, where the query asks how many unique users have we had today, or over the last 1 day, the query may only return 1 as the second user visited 2 days ago. In cases where there is a huge amount of data, only M events may be fetched so that the counter application acts as an approximation of the number of unique values per key. Moreover, post-counting processes may be accounted for or utilized. For example, where a user ID is not shown in the past for a specific user, such as the last year, the account may be flagged as inactive. Moreover, where a user may have multiple user IDs, where the logins are tracked with the user as the key, high counts over a period of time may indicate suspicious activity. For example, if the user as the key shows values (unique user ID logins) in the tens or hundreds, the user may be flagged as opening and utilizing a high volume of accounts to engage in fraudulent activity. Thus, account supervision and review may be necessary.

FIG. 1 is a block diagram of a networked system 100 suitable for implementing various processes described herein, according to some embodiments. As shown, system 100 may comprise or implement a plurality of devices, servers, and/or software components that operate to perform various methodologies in accordance with the described embodiments. Devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110 and an online service provider 120 in communication over a network 140 in the embodiment shown. A user may utilize one or more services of online service provider 120 through an application of communication device 110, such as a web browser application and/or dedicated application of online service provider 120. When performing actions or interacting with online service provider 120, communication device 110 may generate at least one event received by online service provider 120, which may include an event ID to identify the event, a user ID for the user and/or communication device 110, at least one key, and a timestamp for the event ID. The event may be included in a stream of events for online service provider 120. The stream of events may be processed by online service provider 120 to determine a number of unique appearances of a value, such as the user ID, for a key selected to be tracked or examined by a counter application. In various embodiments, communication device 110 may correspond to one of a plurality of communication devices each generating event ID(s) in a stream of events received by online service provider 120.

Communication device 110 and online service provider 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Communication device 110 may be implemented as a communication device that may utilize appropriate hardware and software configured for wired and/or wireless communication with online service provider 120 and/or merchant device 150. For example, in one embodiment, communication device 110 may be implemented as a personal computer (PC), a smart phone, laptop/tablet computer, wristwatch with appropriate computer hardware resources, eyeglasses with appropriate computer hardware (e.g. GOGGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a device application 112, other applications 114, a database 116, and a network interface component 118 in the embodiment shown. Browser/device application 112 and other applications 114 may correspond to executable processes, procedures, and/or applications with associated hardware. In other embodiments, communication device 110 may include additional or different modules having specialized hardware and/or software as required.

Device application 112 may correspond to one or more processes to execute modules and associated devices of communication device 110 to initiate and/or execute some process or action with online service provider 120. In this regard, device application 112 may correspond to specialized hardware and/or software utilized by communication device 110 to provide an interface to permit the user associated with communication device 110 to initiate and/or execute and the action or process, which may correspond to an event tracked by online service provider. In various embodiments, the event may correspond to a navigation or visit to a website, a login to the website, an action or process on the website or a webpage of the website (e.g., a payment process using a payment account, a generation of an account, maintaining or updating an account, etc.), or some other event that an online service provider wishes to track. Device application 112 may be used to send and receive data corresponding to the event, which may include a user ID and one or more keys for the event (e.g., location of device/user, device information for communication device 110, and/or any other data or metadata associated with the event). Device application 112 may be implemented as a user interface enabling the user to enter data and view received data, which may include authentication credentials. In various embodiments, device application 112 may correspond to a general browser application configured to retrieve, present, and communicate information over the Internet (e.g., utilize resources on the World Wide Web) or a private network. For example, device application 112 may provide a web browser, which may send and receive information over network 140, including retrieving website information, presenting the website information to the user, and/or communicating information to the website, including event information. However, in other embodiments, device application 112 may include a dedicated application of online service provider 120 or other entity (e.g., a merchant), which may be configured to assist in processing purchase requests.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 140, or other types of applications. Other applications 114 may also include email, texting, voice and IM applications that allow a user to send and receive emails, calls, texts, and other notifications through network 140. In various embodiments, other applications 114 may include financial applications, such as banking, online payments, money transfer, or other applications. Other applications 114 may also include other location detection applications, such as a mapping, compass, and/or GPS application. Other applications may include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110, in various embodiments. Thus, database 116 may include, for example, identifiers such as operating system registry entries, cookies associated with browser/device application 112 and/or other applications 114, identifiers associated with hardware of communication device 110, or other appropriate identifiers, such as identifiers used for payment/user/device authentication or identification. Database 116 may include user and device data and IDs, which may be transmitted to online service provider 120. In some embodiments, database 116 may not be included in communication device but may be accessible to it.

Communication device 110 includes at least one network interface component 118 adapted to communicate with online service provider 120 in one embodiment. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Online service provider 120 may be maintained, for example, by an online payment service provider, which may provide payment services and/or processing for financial transactions on behalf of users, or any other type of online service or other entity, including merchants, web hosts, online resources, etc. In this regard, online service provider 120 includes one or more processing applications which may be configured to interact with one or more incoming data streams of events to determine counts that check for a unique number of values for some key within each event in the stream of events. In one example, online service provider 120 may be provided by PAYPAL®, Inc. of San Jose, Calif., USA. However, in other embodiments, online service provider 120 may be maintained by or include a credit provider, financial services provider, financial data provider, and/or other service provider, which may be utilized by the user associated with communication device 110.

Online service provider 120 of FIG. 1 includes counting application 130, a service provider application 122, other applications 124, a database 126, and a network interface component 128 in one embodiment. Counting application 130, service provider application 122, and other applications 124 may correspond to executable processes, procedures, and/or applications with associated hardware. In other embodiments, online service provider 120 may include additional or different modules having specialized hardware and/or software as required.

Counting application 130 may correspond to one or more processes to execute modules and associated specialized hardware of online service provider 120 to receive, access, or other retrieve a stream of events and analyze the stream of events to update a database table having a counter of unique values for a key over a time period and/or for time intervals within the time period. In this regard, counting application 130 may correspond to specialized hardware and/or software to first access a database table, such as an events history table which may correspond to a record of historical event. Each event may correspond to an event ID, a user ID, one or more keys, and a timestamp, which may then be the columns of the table. Where the counter for counting application 130 may correspond to unique visitors per country, the events history database may be made specific to that key by having each event for the key "country." Additionally, the column by which counting application 130 counts the number of unique values (e.g., visitors, or user ID) may be indexed.

Note generally that services, processes, and/or functions described herein may be performed by any suitable software, as applicable, of a computer system in various embodiments. Thus, while various functionality is described above for counting application 130, this functionality could be performed by any software of payment provider server 120, in various embodiments. Similar remarks apply to service provider application 122, database 126, other applications 124, device application 112, etc.

Counting application 130 may utilize the database table for the events in an event data stream to update another database table for the key by which counting application 130 counts the number of unique values, or a key container table. In the example of the number of unique visitors per country, the key may be "country" and the key container table may correspond to "country" or a specific country, such as Country A. Where the more general "country" is used, rows of the key container table may each correspond to a specific country or a sub-key, such as Country A, Country B, etc. Counting application 130 may view the days since the last update of the key container table, and may update the key container to shift the columns of the key container by the time interval tracked in the key container table (e.g., shift the columns X days since the last update, where the key container table tracks the number of unique users per country per day). However, where the time since last update is 0, the columns may remain unshifted.

Counting application 130 may then increment each column by 1 each time that a key for a user ID is not found within the events history table based on the timestamp. For example, if the timestamp equals the current time, then all columns may be incremented by one in one embodiment. Where the timestamp is prior to the current time, only those columns at the time stamp and prior times may be incremented by 1 for that user ID. However, if the user ID is previous found to have the key, and thus has previously been counted, only the columns may be incremented by 1 for those time since the previous event ID for the user ID having the key until present (e.g., only update from present date to N−1, where N equals the last timestamp for the event ID having the user ID and the tracked key). Counting application 130 may then make the counter available by allowing lookups and queries to the key container table.

Service provider application 122 may correspond to one or more processes to execute modules and associated specialized hardware of online service provider 120 to provide a service, website, or other online resource to the user of communication device 110 for the user of communication device 110 to interact with and generate events in a stream of incoming events in some embodiments. In this regard, service provider application 122 may correspond to specialized hardware and/or software to establish payment accounts, which may be utilized to provide the online resource. The user of communication device 110 may utilize communication device 110 to access the resource and perform one or more actions or processes, which may generate data for the process in the form of an event. The event may include an event ID, a user ID, one or more keys, and a timestamp. The event may be part of a stream of events, which may be stored to database tables and/or processed by counting application 130.

In various embodiments, online service provider 120 includes other applications 124 as may be desired in particular embodiments to provide features to online service provider 134. For example, other applications 124 may include security applications for implementing server-side security features, programmatic client applications for interfacing with appropriate application programming interfaces (APIs) over network 140, or other types of applications. Other applications 124 may contain software programs, executable by a processor, including a graphical user interface (GUI), configured to provide an interface to the user when accessing online service provider 134. In various embodiments where not provided by service provider application 122, other applications 124 may include connection and/or communication applications, which may be utilized to communicate information to over network 140.

Additionally, online service provider 120 includes database 126 in the embodiment shown. As previously discussed, the entity corresponding to merchant device 150 may establish one or more accounts with online service provider 120. Accounts in database 126 may include entity information, such as name, address, birthdate, payment/funding information, additional user financial information, and/or other desired user data. The entity may link to their respective accounts through an account, user, merchant, and/or device identifier. Thus, when an identifier is transmitted to online service provider 120, e.g. from communication device 110 and/or merchant device 150, an account belonging to the entity may be found. Database 126 may store one or more database tables, including an events history table and a key container table. Additionally, one or more applications and/or programs may be stored to database 126 for execution, including daemons such as counting application 130.

In various embodiments, online service provider 120 includes at least one network interface component 128 adapted to communicate communication device 110, home device 130, and/or merchant device 150 over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
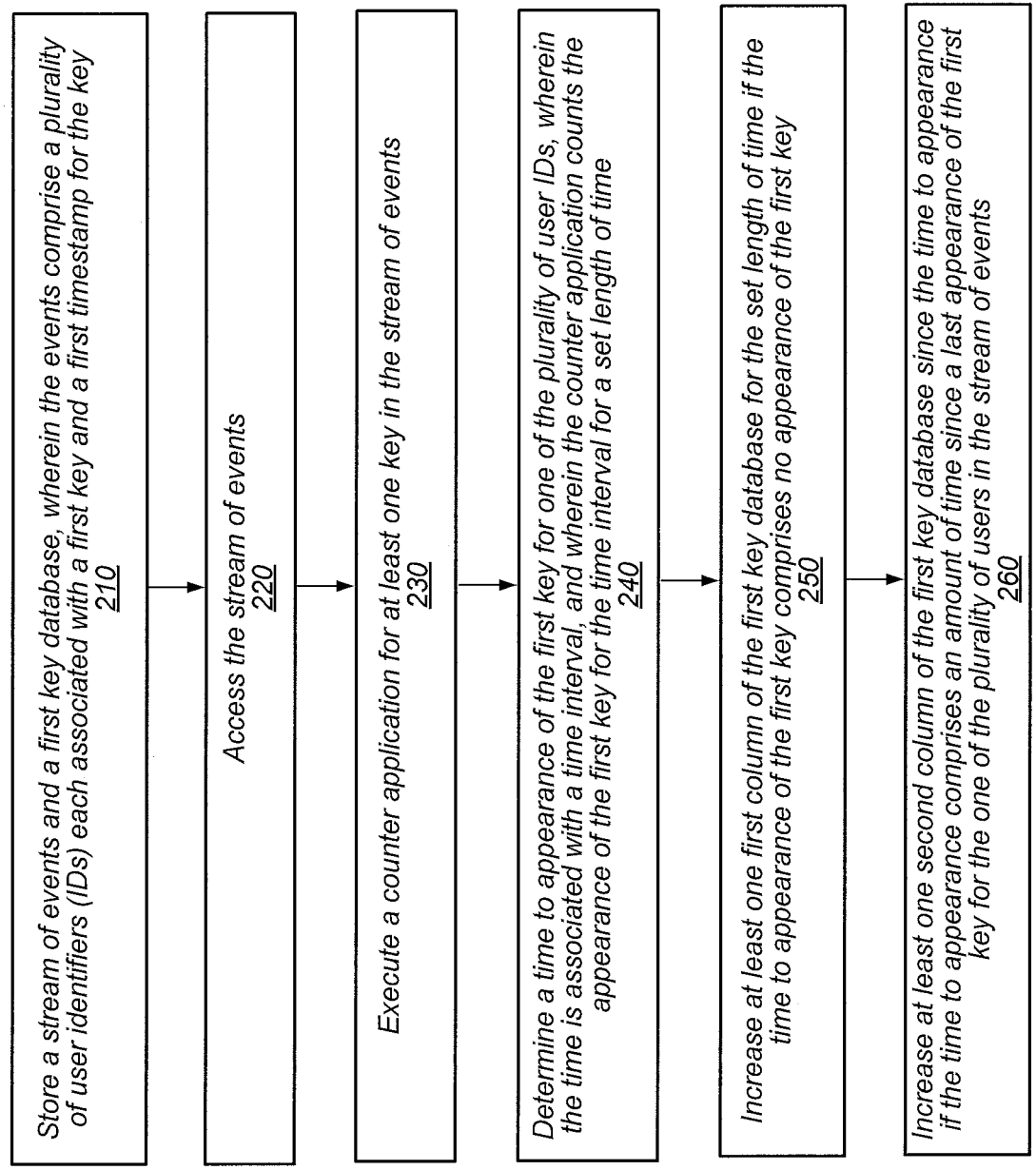
FIG. 2 illustrates a process flow, according to some embodiments.

FIG. 2 is a process flowchart, according to some embodiments, for an event stream counter to track distinct values per key, according to an embodiment. Note that one or more steps, processes, and methods described herein may be omitted, performed in a different sequence, or combined as desired or appropriate.

At operation 202, a stream of events and a first key database is stored, wherein the events comprises a plurality of user identifiers (IDs) each associated with a first key and a first timestamp for the key. At operation 204, the stream of events is accessed, and at operation 206, a counter application for at least one key in the stream of events is executed. A time to appearance of the first key for one of the plurality of user IDs is determined, using the counter application, wherein the time is associated with a time interval, and wherein the counter application counts the appearance of the first key for the time interval for a set length of time, at operation 208. Thus, at operation 210, at least one first column of the first key database is increased for the set length of time if the time to appearance of the first key comprises no appearance of the first key. However, at operation 212, at least one second column of the first key database is increased since the time to appearance if the time to appearance comprises an amount of time since a last appearance of the first key for the one of the plurality of user in the stream of events.

Turning to FIG. 3, a diagram 300 of one embodiment of a database record 300 is shown. In this example, database record 300 is shown at a time and date of 5:00 pm on Jan. 2, 2017 (Jan. 2, 2017).

Database record 300 relates to one way that event counters can be maintained relative to database information. As will be explained, however, the structure of database record 300 has certain drawbacks that can be mitigated or avoided entirely using other techniques described herein.

Note that in various embodiments, a database may contain many records such as record 300. In some cases, the number of records may be in the hundreds, thousands, hundreds of thousands, millions, or even billions.

As shown, database record 300 includes fields 302, 304, 306, 308, 310, and 312. Field 302 stores a name, in this case "John Smith". Field 304 stores account identifiers (IDs) associated with an event that occurred involving the name John Smith. These events, as discussed above, may be a login to a website and/or service (such as an electronic payment service), a successful transaction to purchase a good or service, a failed transaction to purchase a good or service, an account change (change in name, address, email, password, linked funding instruments such as credit or debit cards, linked bank account, etc.).

Field 306 stores times associated with particular events. In the first row, for example, an event associated with the name John Smith and the account ID 1234 occurred at 2:34 pm on Jan. 1, 2017. Field 308 stores event details. These details are omitted from the diagram for ease of understanding, but may include any type of information relating to an event—IP address or location of a user, type of event, whether the event completed successfully or failed, price of a transaction, etc.

Field 310 stores an event counter for events that occurred in the last 24 hours for the name John Smith for unique account IDs. In this example, the current time is 5:00 pm on Jan. 2, 2017; thus the event counter in field 310 reflects that one account ID for the name John Smith has had only one unique account ID for events occurring in the last 24 hours (account ID 5678). Field 312 is similar, but is for events occurring in the last 48 hours.

Note that in this example, we are not double-counting the two events involving account ID 5678. The counter in field 310 is instead reflective of how many different unique accounts have activity under a particular name (e.g. John Smith) in a particular time period (e.g. last 24 hours). An accelerated amount of unique account usage associated with the particular name can indicate an uptick in fraudulent activity, but a single user making several transactions within a short period of time does not necessarily have a strong predictive value for fraud associated with a particular name.

For example, when a fraudster is active, he may have multiple user accounts on which he is conducting fraudulent transactions. Nonetheless, these multiple user accounts may have some underlying factor(s) in common. A fraudster who is making multiple purchases of items on the internet might have them all shipped under the same name so that the deliveries reach him (e.g., the fraudster could use ten different compromised or fraudulent electronic transaction accounts to ship orders).

Note that techniques described herein are not limited to names alone. Fraudsters may also have other underlying account characteristics with similarities, such as street address/shipping address, postal code, email address, contact phone number, country for the account, etc. Other embodiments might track shipping address for example, as a fraudster might use multiple very names but still ship fraudulently ordered goods (that the fraudster never intends to pay for out of a legitimate account for himself) to a same address. Thus, all the techniques described with respect to names (both relative to FIG. 3, as well as other figures) are equally applicable and contemplated for use with other types of information such as that noted above.

Thus, in this example, field 310 includes a counter value for how many unique account IDs have had a relevant event recorded (e.g., purchase transaction, declined purchase, address change, login, whatever is being tracked) within a particular time period. Correctly keeping this field updated can be challenging, however.

In this example, to determine if field 310 should be updated, a list of account IDs is maintained in field 304. This list can grow lengthy, particularly in a large user base. Due to database limitations, field 304 (account IDs) may have to be restricted to a particular size, such as 4 KB for example. Since this field may be maintained for every single name that is monitored, making the field larger can present spatial limitations (e.g., imagine this field being repeated for hundreds of thousands or even millions of possible names). It is also not viable, in various embodiments, to have this field vary in size as this may be unsupported by the database (or make retrieval too slow to meet service guarantees).

The limited size (e.g. 4 KB, though other values can be used) of field 304 causes other problems, however. This field size might support, for example, 1000 different account IDs (or some other limited number). For popular or common names, however, this number may be exceeded within a particular time period. If the name "John Smith" often appears for events involving 2,500 different unique accounts on a daily basis, a field size supporting only 1000 account IDs may be partially or completely unhelpful for making fraud predictions. E.g., the system may be unable to capture an increased velocity of use for an account name (indicating possible fraud) because it may have to use a shorter time period (e.g. 8 hours instead of 24 hours), etc.

Thus, maintaining lists of account IDs can be a significant problem in maintaining a database that allows determinations of usage velocity for names (or addresses or other data), particularly based on events. The lists of account IDs may take considerable amounts of space, and may be insufficient to effectively track velocity in large data environments. If velocity cannot be tracked properly, then risk of fraud may not be properly assessed for certain transactions.

By using a different organizational scheme such as that discussed relative to FIGS. 4A-4D, however, problems for schemes similar to that of FIG. 3 can be mitigated.

Figure 4A:
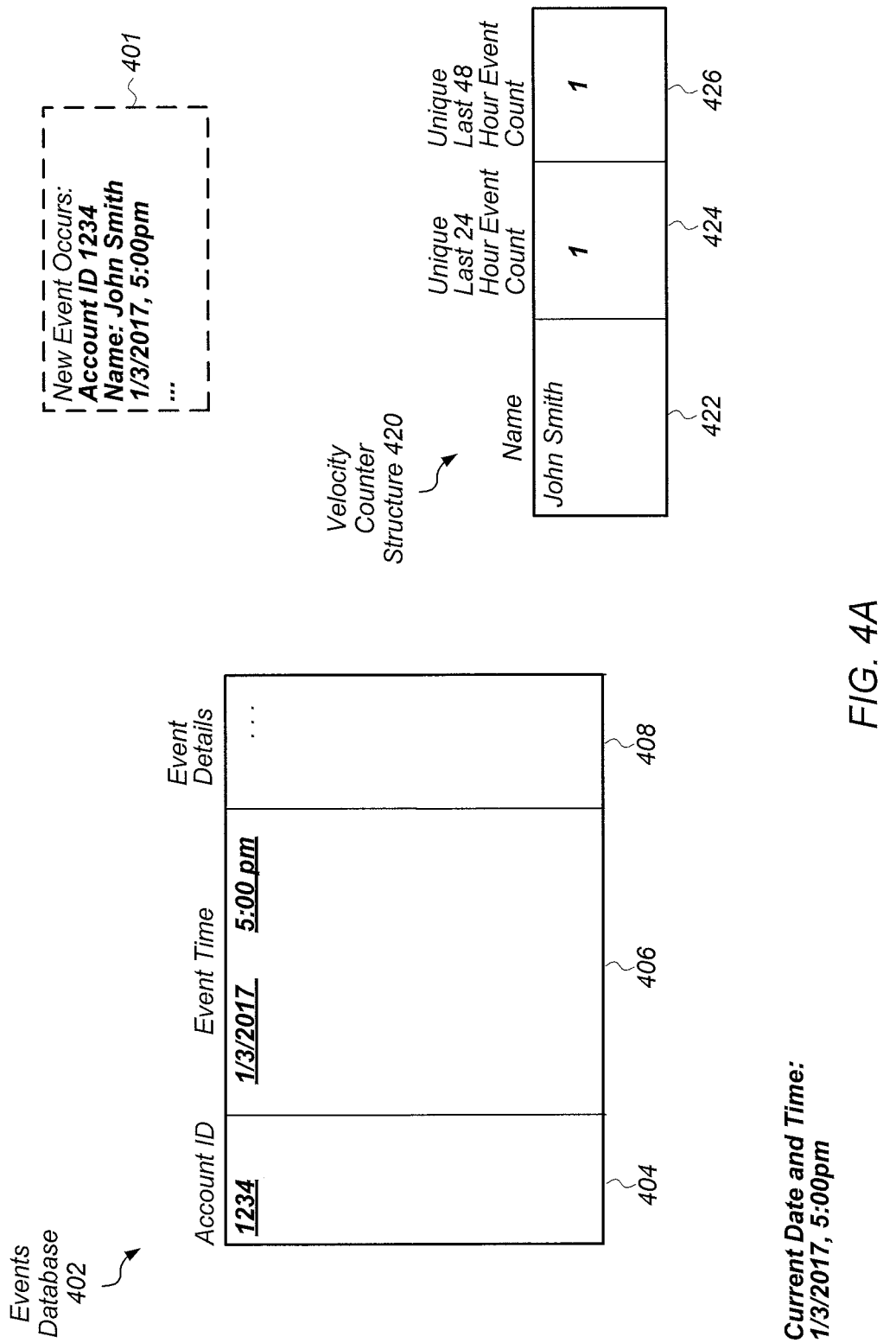
FIGS. 4A-4D illustrate examples relating to an events database and a velocity counter.

Turning to FIG. 4A, a diagram is shown of one embodiment of an example relating to an events database and a velocity counter structure for a particular name (John Smith). Each of FIGS. 4A, 4B, 4C, and 4D relate to this example as it progresses through different events and points in time. Note that the operations described relative to FIGS. 4A-4D may be performed by provider server 120, in various embodiments, or any suitable computer system.

In FIG. 4A, information bubble 401 shows a new event that is occurring (or has just recently occurred). In this case, the new event involves account ID 1234 and the name John Smith, and has a time of 5:00 pm on Jan. 3, 2017. (Note of course that instead of name, it is possible to implement similar techniques, which may be performed in parallel in some cases, on other information such as shipping address, country, postal code, etc. as discussed above).

Events database 402 is configured to store logs of various events of interest that have occurred. Note that events database 402 may be a very large database, and may have many millions of events added on a daily basis in various embodiments. For ease of explanation, only events involving the name John Smith are shown in FIGS. 4A-4D.

Further, events database 402 may be indexed to one or more database keys—in particular, events database 402 may be indexed to unique account IDs for a system. In an electronic payment system, for example, every user may have a unique account ID. By indexing events database 402 to unique account IDs, it can be optimized so that it is extremely efficient to query on an account ID, even if the database is large (or very large). This indexing property can be taken advantage of to mitigate or eliminate some of the problems discussed above relative to FIG. 3, where a list of account IDs was maintained. As will be seen in this example embodiment, no list of account IDs need be maintained for each name (or other monitored data item on which velocity of use information may be desirable for risk and fraud purposes).

In FIG. 4A, events database 402 is updated to include on its first row the value 1234 for an account ID in field 404 and a time of 5:00 pm on Jan. 3, 2017 in field 406. Various event details may be stored in field 408, but are again omitted here for ease of explanation. Event details in field 408 can include any information about an event, including information such as associated name, shipping address, etc. (as variously discussed above).

In association with updating events database 402, velocity counter structure 420 is also updated. In this example, velocity counter structure 420 is for the name John Smith (as shown in field 422), and has a first counter in field 424 and a second counter in field 426.

The first counter in field 424 is reflective of how many events have occurred in the last 24 hours involving the name John Smith and a unique account ID (not previously counted already in this time period, to avoid double counting activity within a single account). The second counter in field 426, similarly, is reflective of how many events have occurred in the last 48 hours involving the name John Smith and a unique account ID (not previously counted already in this time period).

As noted, counter values for fields 424 and 426 may be updated based on new events occurring. In FIG. 4A, the event shown in information bubble 401 is the first event associated with the name John Smith and account ID 1234, and both counter values are updated to 1 (as this event occurred within the last 24 and the last 48 hours).

Figure 4B:
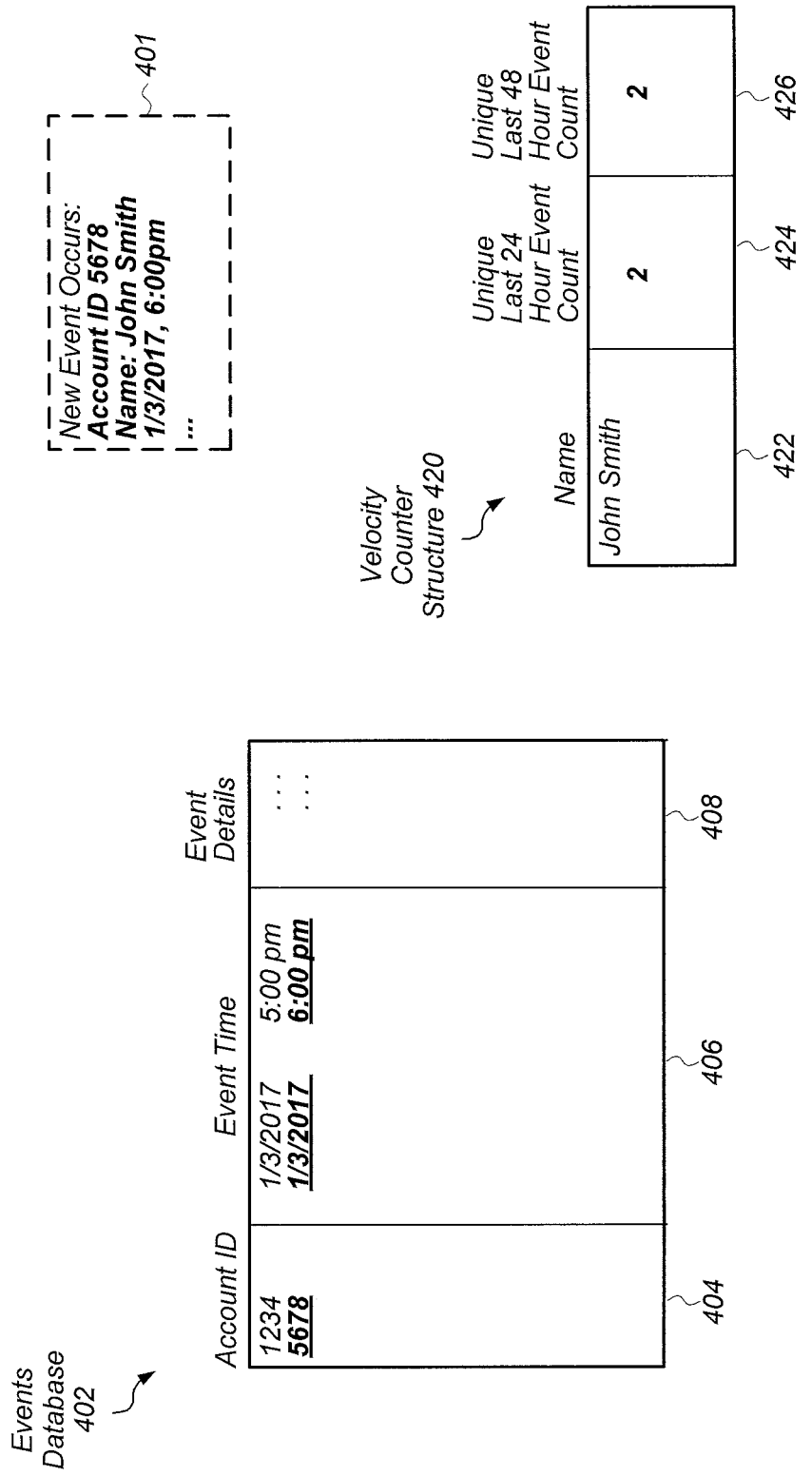

Turning to FIG. 4B, a diagram is shown related to the embodiment of FIG. 4A, at a later time. In this diagram, a new event has occurred at 6:00 pm on Jan. 3, 2017. This new event is associated with the name John Smith and an account ID of 5678.

At this time, provider server 120 may query events database 402 to determine if the account ID of 5678 has been used in association with the name John Smith within the last 24 or 48 hours (or any desired time period). In some instances, this may include running a query using account ID 5678 as a database key to enable quick lookup. This query may also further include examining field 408 for details as needed (e.g. it is possible that account ID 5678 could be in database 402, but for an event that was not associated with the name John Smith, in which case provider system would not update counters for fields 424 and 426).

In the case of FIG. 4B, account ID 5678 only appears once in association with the name John Smith within the relevant time frames, so the counters in fields 424 and 426 are updated to a value of 2 each.

Figure 4C:
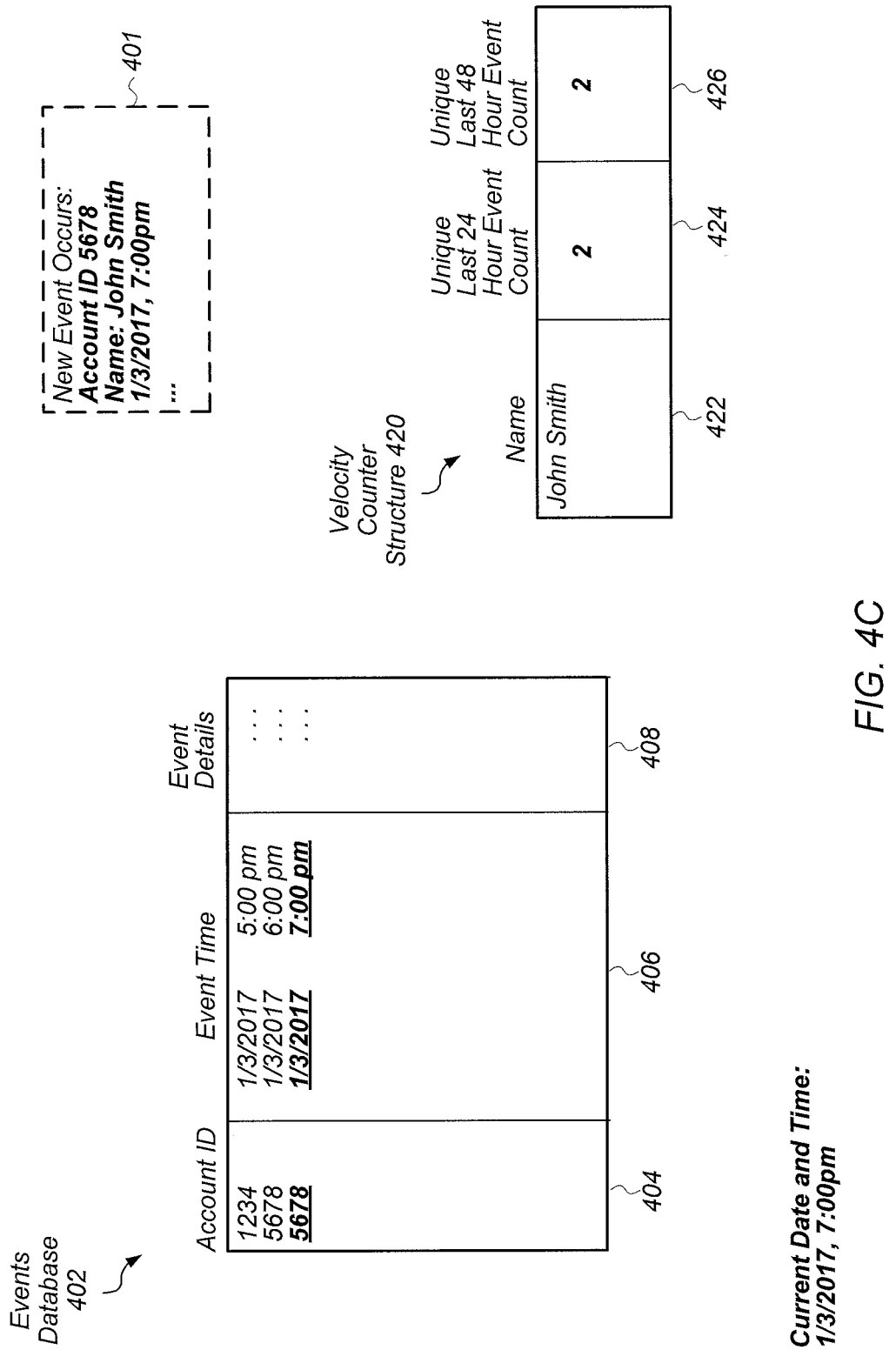
Figure 4D:
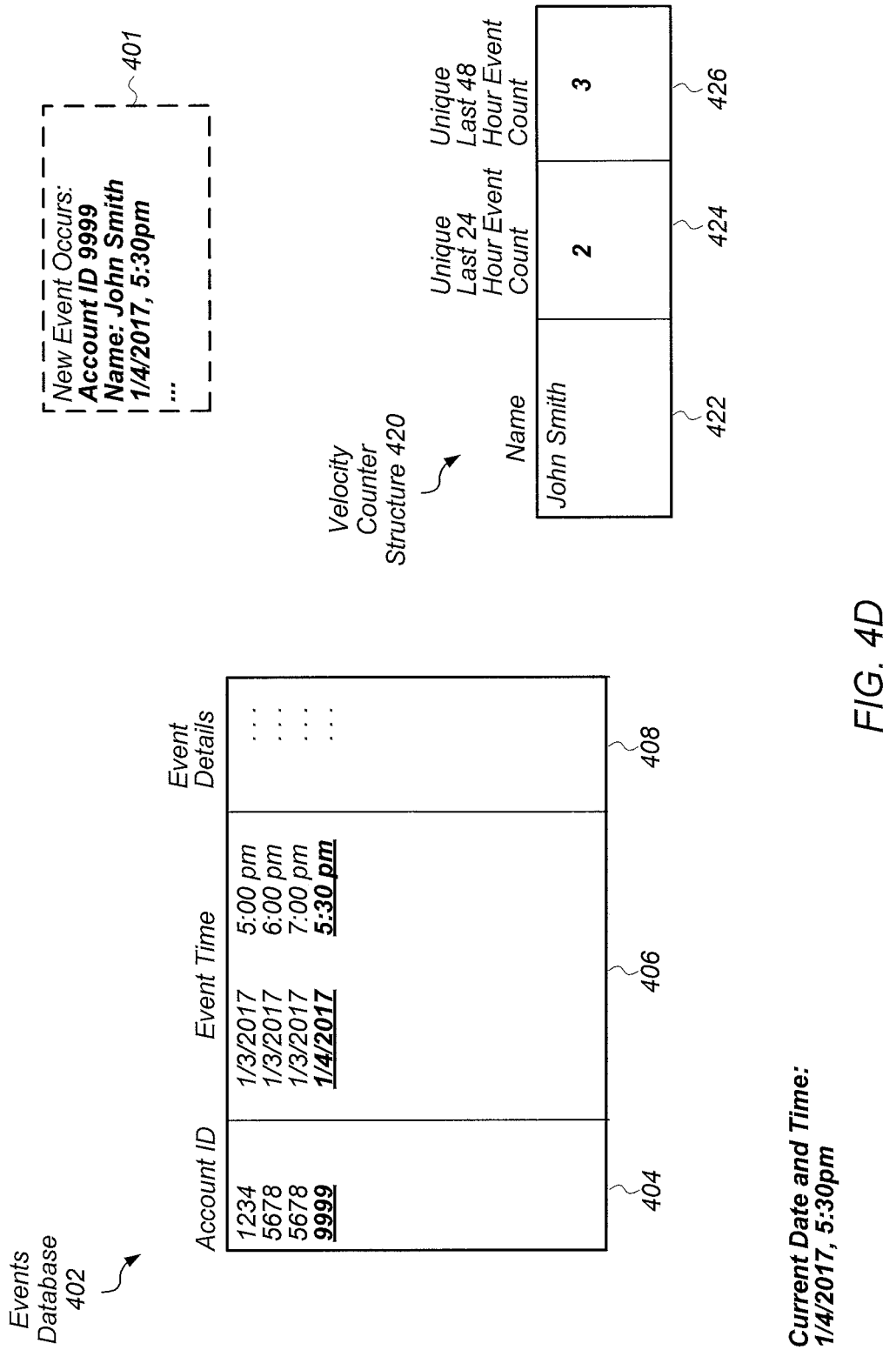

Turning to FIG. 4C, a diagram is shown related to the embodiment of FIG. 4B, at a later time. In this example, yet another new event is indicated in information bubble 401. The new event is for account ID 5678 (again) in association with the name John Smith at a time of 7:00 pm on Jan. 3, 2017.

Provider server may query events database 402 using account ID 5678 as an index. In the embodiment of FIG. 4C, however, it can be seen that account ID 5678 showed up in the event log in association with the name John Smith only an hour previously.

Because of this duplication, the counter values for fields 424 and 426 are not updated. The events at 6:00 pm and 7:00 pm for account ID 5678 (and name John Smith) represent similar activity, and for fraud and risk purposes, are not double counted in this example. These two event s Turning to FIG. 4D, a diagram is shown related to the embodiment of FIG. 4C, at a later time. In this example, a new event is indicated in information bubble 401 for account ID 9999 in association with the name John Smith at a time of 5:30 pm on Jan. 4, 2017.

Events database 402 may be queried by provider server 120 using the account ID 9999 as a database key. After provider server 120 sees that this is a first occurrence (not a duplicate) for this account ID in association with the name John Smith, within the relevant 24 and 48 hour time windows, the counter values for fields 424 and 426 are again updated.

Note that in this example, however, the earliest event from FIG. 4A has aged out of the 24 hour window for the event counter in field 424. It is not counted in this window because the current time is 5:30 pm on Jan. 4, 2017, and the event at 5:00 pm on Jan. 3, 2017 occurred more than 24 hours ago. This event still occurred within the last 48 hours, however, and is still counted in the event counter for field 426. Decreasing counter values (e.g. for a given window) can be performed according to various techniques. In some cases, a periodic routine may be run to determine what events have aged out of a window and then removing counter values for those events. In other embodiments, a window may slide over into an older period, while establishing a new window, as further discussed below.

Figure 5:
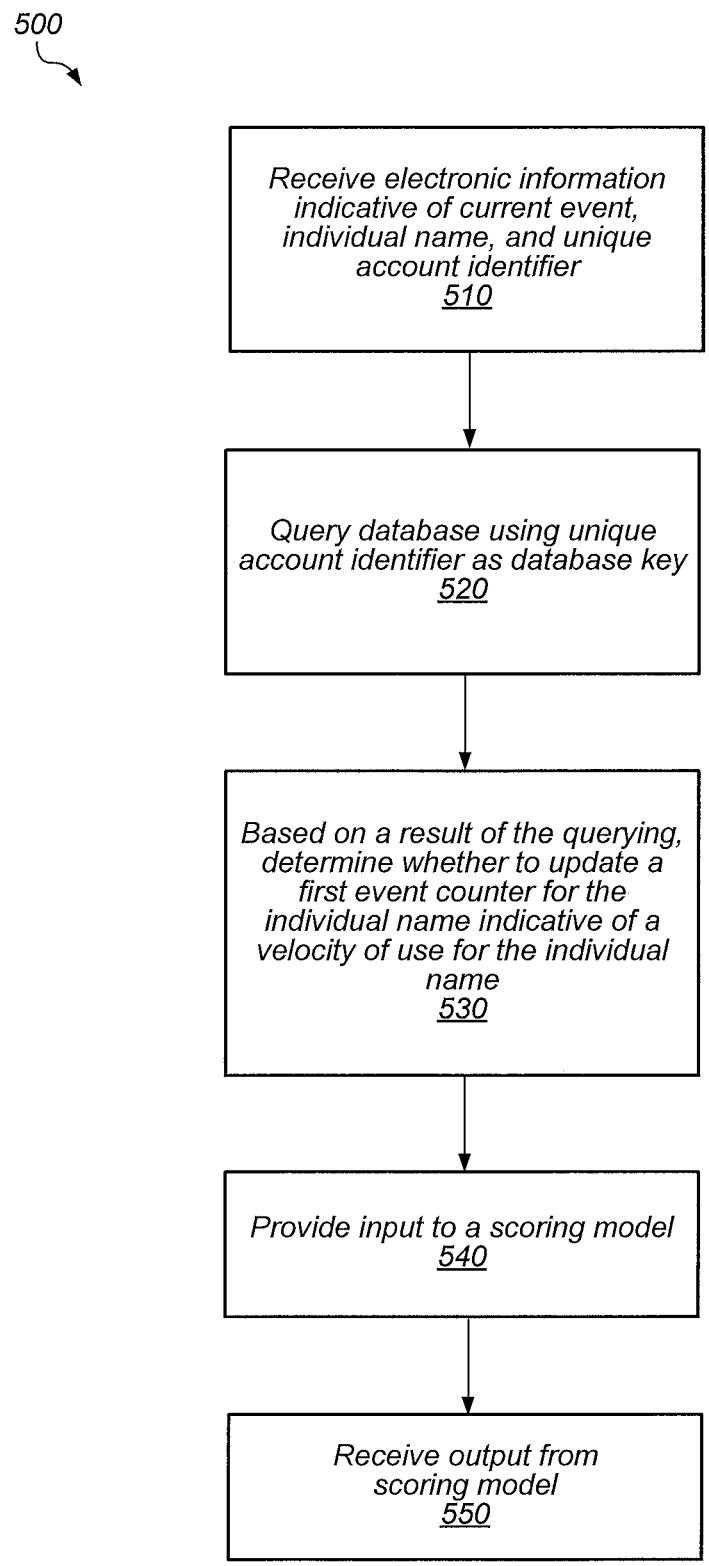
FIG. 5 illustrates a flowchart of a method.

Turning now to FIG. 5, a flow chart of one embodiment of a method 500 is shown. Note that any of the techniques described above, e.g. for FIG. 4, may be applicable to method 500, as will be apparent from the below description. Some or all of the operations of method 500 may be performed by provider server 120, in various embodiments, or any other suitable computer system. For ease of explanation, however, provider server 120 will be used for explanation of method 500.

In operation 510, in one embodiment, provider server 120 receives electronic information indicative of a current event, an individual name, and a unique account identifier for an electronic payment account related to the current event. The current event may be a transaction attempt, for example, to make an online purchase using a PAYPAL™ electronic payment account, or to change account details for an electronic payment account. The associated name could be a value such as "John Smith", and the unique account identifier could be any value (not limited to numbers) that uniquely identifies an account involved in the event (e.g. within the ecosystem of an electronic payment processor).

Note that for method 500, the example given is for a name value. Similar to above, this method could be performed for values other than names, such as address, etc. In general, any disclosure herein relating to an individual's name can be used and adapted for other values (which may be predictive of fraud and risk) throughout the various examples and embodiments discussed.

In operation 520, in one embodiment, provider system 120 queries a database, using a unique account identifier as a database key, to determine whether one or more logged events involving the account identifier have occurred over a particular time period. This operation may comprise querying events database 402 for example as discussed above relative to FIG. 4. (Note that in some embodiments, database 126 includes all or a portion of events database 402.) The query may be submitted as an SQL query in various embodiments, but is not limited to this format.

In operation 530, based on a result of the querying in operation 520, provider system 120 determines whether to update a first event counter for an individual name that is indicative of a velocity of use for the individual name, in one embodiment. This may further comprise if the query result indicates that no logged events involving the account identifier occurred over the particular time period, increasing the first event counter, or if the query result indicates that at least one logged event involving the account identifier occurred over the particular time period, making no adjustment to the first event counter (e.g. to avoid double counting for a same account).

Thus, operation 530 in some embodiments includes updating an event counter such as the 24 hour window counter in field 424 (from the examples of FIGS. 4A-4D). The higher this counter for a particular time window (which need not be 24 hours), the greater velocity a particular value (such as individual name) may be said to have. As previously discussed, the velocity of a name, shipping address, etc., may be limited to unique accounts for purposes of determining fraud and risk.

In operation 540, in one embodiment, subsequent to determining whether to update the first event counter, provider server 120 provides the event counter, the individual name, and the current event as inputs to a scoring model. This scoring model may be implemented with executable code by provider server 120 and/or another system, and may be a risk scoring model that evaluates risk for a current and/or future transaction.

Note that operation 540 may include providing various other data to the scoring model as well. In some embodiments, a great deal of data may be provided to the scoring model—prior electronic payment transactions, home address, network information such as IP address, device information (display, font settings information, browser information) and/or other information.

Historical baseline data is provided to the scoring model in various embodiments. This data may be based on prior observations in event velocity for particular names, particular countries for shipping addresses, particular postal codes, etc. For example, provider system 120 may maintain historical log information on how often the name John Smith is typically used in connection with one or more types of events. If John Smith typically appears in connection with 750 unique accounts in a 24 hour time period, a current event counter of 500 for the last 24 hours might indicate slower than normal velocity of usage. In contrast, a current event counter of 3000 might indicate a dramatically increased velocity of usage (e.g. 400% above normal). The historical baseline data may also be normalized across different time periods (e.g. weekends may have different patterns than weekdays, holidays may have higher traffic than normal, etc.). Thus historical baseline data can be scaled as deemed appropriate before feeding the data into a scoring model.

In operation 550, in one embodiment, provider server 120 receives an output from the scoring model based on the provided inputs. This output may be a risk score (e.g. on a scale from 0 to 100) based on many factors in addition to such factors as velocity of name. The overall risk score may indicate whether an electronic payment transaction will be approved, partially approved (e.g. at a lower limit than requested), or if an account change transaction will be permitted for example.

Note that various examples above discussed a 24 hour window and 48 hour window were used for maintaining event counters. In various embodiments, a number of different windows may be used, counters for which may be implemented in a circular array. When providing data to a scoring model such as a risk scoring model that provides a numerical output, multiple window values may be provided in various cases. Thus, name velocity values for last 1 day, 2 day, 3 days, 4 days, etc. could be provided and used by a risk model. The windows may also have more granular (or less granular) periods of time, such as hourly windows, 6 hour window chunks, etc.

Note that various examples above were given for the name "John Smith". In some cases, name variants may be standardized using certain rules for cleaner processing. Thus, "Jon Smith" and "John Smith" might be lumped together for purposes of velocity of use. The names "Alexander" and "Alex" as first names might both be processed under the name "Alex". Various rule sets can be applied to effect such changes.

Computer-Readable Medium

Figure 6:
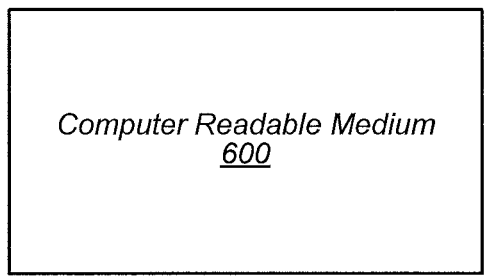
FIG. 6 is a block diagram of one embodiment of a computer readable medium.

Turning briefly to FIG. 6, a block diagram of one embodiment of a computer-readable medium 600 is shown. This computer-readable medium may store instructions corresponding to the operations of FIG. 5 and/or any techniques described herein. Thus, in one embodiment, instructions corresponding to FIG. 5 may be stored on computer-readable medium 500.

Program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Computer System

Figure 7:
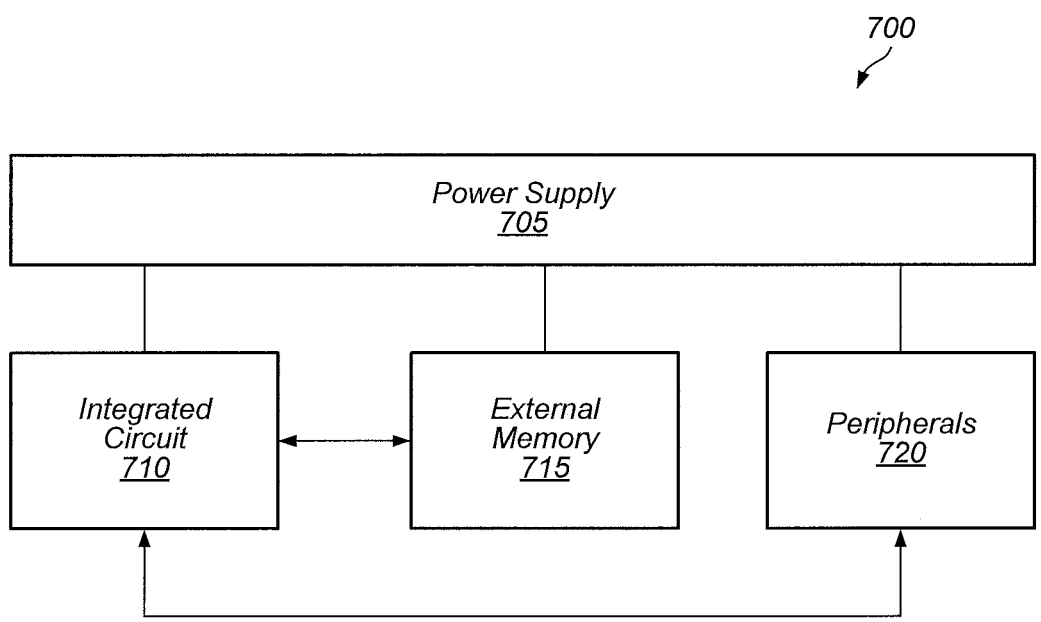
FIG. 7 is a block diagram of one embodiment of a system.

In FIG. 7, one embodiment of a computer system 700 is illustrated.

In the illustrated embodiment, system 700 includes at least one instance of an integrated circuit (processor) 710 coupled to an external memory 715. The external memory 715 may form a main memory subsystem in one embodiment. The integrated circuit 710 is coupled to one or more peripherals 720 and the external memory 715. A power supply 705 is also provided which supplies one or more supply voltages to the integrated circuit 710 as well as one or more supply voltages to the memory 715 and/or the peripherals 720. In some embodiments, more than one instance of the integrated circuit 710 may be included (and more than one external memory 715 may be included as well).

The memory 715 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to Battu memory modules such as single inline memory modules (SIMMs), dual inline memory modules (DIMMs), etc. Alternatively, the devices may be mounted with an integrated circuit 710 in a chip-on-chip configuration, a package-on-package configuration, or a multi-chip module configuration.

The peripherals 720 may include any desired circuitry, depending on the type of system 700. For example, in one embodiment, the system 700 may be a mobile device (e.g. personal digital assistant (PDA), smart phone, etc.) and the peripherals 720 may include devices for various types of wireless communication, such as wifi, Bluetooth, cellular, global positioning system, etc. Peripherals 720 may include one or more network access cards. The peripherals 720 may also include additional storage, including RAM storage, solid state storage, or disk storage. The peripherals 720 may include user interface devices such as a display screen, including touch display screens or multitouch display screens, keyboard or other input devices, microphones, speakers, etc. In other embodiments, the system 700 may be any type of computing system (e.g. desktop personal computer, server, laptop, workstation, net top etc.). Peripherals 720 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
a non-transitory memory; and
one or more hardware processors communicatively coupled to the non-transitory memory and configured to read instructions from the non-transitory memory to cause the system to perform operations comprising:
receiving information indicating an event of a particular event type, wherein the information comprises a name, and an account identifier for a user account associated with the event;
querying an event database by using the account identifier as a database key, wherein the event database comprises data associated with a plurality of logged events;
determining a number of logged events of the particular event type involving the account identifier that have occurred over each of a plurality of different time intervals within a particular time period based on the querying;
updating an event counter data structure based on the number of logged events of the particular event type associated with each of the plurality of different time intervals, wherein the event counter data structure has a plurality of columns corresponding to the plurality of different time intervals in the particular time period, respectively, wherein a value in each column of the plurality of columns represents a number of occurrences of events of the particular event type within a corresponding time interval, and wherein the updating the event counter data structure comprises:
shifting the plurality of columns based on a time that the event counter data structure was last updated;
determining whether any logged events involving the account identifier occurred over a first time interval of the plurality of different time intervals; and
in response to determining that no logged events involving the account identifier occurred over the first time interval, incrementing the value in a first column of the plurality of columns corresponding to the first time interval;
subsequent to the updating, receiving a transaction request associated with the user account;
determining a risk score associated with the user account by providing data of the event counter data structure as inputs to a scoring model; and
processing the transaction request based on the risk score.

2. The system of claim 1, wherein the event database is a relational database having a plurality of keys for querying the event database.

3. The system of claim 1, wherein the plurality of different time intervals are non-overlapping.

4. The system of claim 1, wherein the plurality of columns in the event counter data structure is arranged as a circular array.

5. The system of claim 1, wherein the scoring model is configured to provide a numerical risk score value representing a risk level.

6. The system of claim 1, wherein the operations further comprise transmitting the risk score to an entity.

7. The system of claim 1, wherein processing the transaction request comprises approving or denying the transaction request based on the risk score.

8. A method, comprising:
receiving, by a computer system, a request for assessing a risk associated with an event involving a particular account that has an account identifier and is associated with a name;
querying, by the computer system, an event database using the account identifier as a database key, wherein the event database comprises data associated with a plurality of logged events;
determining, by the computer system, a number of logged events involving the account identifier that have occurred over each of a plurality of different time intervals within a particular time period based on the querying;
updating, by the computer system, an event counter data structure based on the number of logged events associated with each of the plurality of different time intervals, wherein the event counter data structure has a plurality of columns corresponding to the plurality of different time intervals in the particular time period, respectively, wherein a value in each column of the plurality of columns represents a number of occurrences of events within a corresponding time interval, and wherein the updating the event counter data structure comprises:

shifting the plurality of columns in the event counter data structure based on a time that the event counter data structure was last updated;
determining whether any logged events involving the account identifier occurred over a first time interval of the plurality of different time intervals; and
in response to determining that no logged events involving the account identifier occurred over the first time interval, incrementing the value in each of the plurality of columns;
providing, by the computer system, data of the event counter data structure as inputs to a scoring model; and
providing, by the computer system, an output of the scoring model as a response to the request.

9. The method of claim 8, wherein the first time interval overlaps partially with a second time interval in the plurality of different time intervals.

10. The method of claim 8, wherein the plurality of columns is implemented as a circular array.

11. The method of claim 8, wherein the event is a transaction for the particular account, and wherein the scoring model assesses a risk associated with performing the transaction.

12. The method of claim 11, wherein the transaction is an electronic purchase transaction made via the Internet.

13. The method of claim 8, wherein the event database includes a plurality of records, each of the plurality of records corresponds to a respective logged event and comprises one or more details of the corresponding logged event and an account identifier involved in the corresponding event.

14. The method of claim 8, further comprising:
computing a historical baseline value based on the values in the event counter data structure; and
providing the historical baseline value to the scoring model.

15. The method of claim 8, further comprising approving the transaction related to the event based on the output of the scoring model.

16. The method of claim 8, further comprising denying a transaction related to the event based on the output of the scoring model.

17. The method of claim 8, further comprising:
accessing a stream of events; and
updating the event counter data structure based on the stream of events.

18. The method of claim 8, wherein the event counter data structure stores information associated with a number of unique account identifiers involved in logged events that are associated with the name over the plurality of different time intervals.

19. A non-transitory machine-readable medium having stored thereon machine-readable instructions executable to cause a machine to perform operations comprising:
receiving an indication of an event involving an account having an account identifier;
querying an event database using the account identifier as a database key, wherein the event database comprises data associated with a plurality of logged events;
determining a number of logged events involving the account that have occurred over each of a plurality of different time intervals within a particular time period based on the querying;
updating an event counter data structure based on the number of logged events associated with each of the plurality of different time intervals, wherein the event counter data structure has a plurality of columns corresponding to the plurality of different time intervals in the particular time period, respectively, wherein a value in each column of the plurality of columns represents a number of occurrences of events within a corresponding time interval, and wherein the updating the event counter data structure comprises:
shifting the plurality of columns in the event counter data structure based on a time that the event counter data structure was last updated;
determining whether any logged events involving the account occurred over a first time interval of the plurality of different time intervals; and
in response to determining that no logged events involving the account identifier occurred over the first time interval, incrementing the value in each of the plurality of columns; and
generating a risk score for the event based on data within the event counter data structure.

20. The non-transitory machine-readable medium of claim 19, wherein the operations further comprise:
determining an amount of time elapsed from the time that the event counter data structure was last updated; and
determining a number of columns for shifting based on the amount of time elapsed, wherein the shifting comprises shifting the plurality of columns by the determined number of columns.

* * * * *